(12) United States Patent
Krumscheid

(10) Patent No.: US 6,241,075 B1
(45) Date of Patent: Jun. 5, 2001

(54) DEVICE FOR PURIFICATION OF CONVEYER BELTS

(75) Inventor: Gregor Krumscheid, Rossbach/Reifert (DE)

(73) Assignee: Maschinenbau Krumscheid GmbH, Breitscheid (DE)

( * ) Notice: Subject to any disclaimer, the term of this patent is extended or adjusted under 35 U.S.C. 154(b) by 0 days.

(21) Appl. No.: 09/388,364

(22) Filed: Sep. 1, 1999

(30) Foreign Application Priority Data

Mar. 23, 1999 (DE) ................................................ 199 13 361

(51) Int. Cl.[7] .................................................. B65G 45/00
(52) U.S. Cl. ............................................ 198/499; 198/497
(58) Field of Search .................................... 198/499, 497, 198/498

(56) References Cited

U.S. PATENT DOCUMENTS

| | | | | |
|---|---|---|---|---|
| 4,105,109 | * | 8/1978 | Schultz ................................. | 198/499 |
| 4,257,517 | * | 3/1981 | MacPherson et al. ............... | 198/497 |
| 4,269,301 | * | 5/1981 | Gibbs ................................... | 198/499 |
| 4,290,520 | * | 9/1981 | Rhodes ................................ | 198/499 |
| 4,694,952 | * | 9/1987 | Meijer ................................. | 198/499 |
| 4,768,645 | * | 9/1988 | Farris .................................. | 198/499 |
| 4,781,284 | * | 11/1988 | Birkheuer et al. .................. | 198/499 |
| 4,888,200 | * | 12/1989 | Milliken .............................. | 198/499 |
| 4,962,845 | * | 10/1990 | Gibbs .................................. | 198/499 |
| 5,213,197 | * | 5/1993 | Mohri .................................. | 198/499 |
| 5,248,026 | * | 9/1993 | Morefield ............................ | 198/499 |
| 5,339,947 | * | 8/1994 | Campanile .......................... | 198/499 |
| 5,622,249 | * | 4/1997 | Morin .................................. | 198/499 |
| 5,628,392 | * | 5/1997 | Stoll et al. .......................... | 198/499 |
| 5,722,528 | * | 3/1998 | Dolan .................................. | 198/499 |
| 6,003,657 | * | 12/1999 | Mott .................................... | 198/499 |
| 6,041,913 | * | 3/2000 | Dolan .................................. | 198/499 |
| 6,056,111 | * | 5/2000 | Stoll et al. .......................... | 198/499 |

* cited by examiner

Primary Examiner—Christopher P. Ellis
Assistant Examiner—Khoi H. Tran
(74) Attorney, Agent, or Firm—George W. Dishong

(57) ABSTRACT

The invention relates to a device for cleaning heavily soiled conveyor belts and is distinguished by a fluid-loaded transversely acting stripper (1) which is arranged transversely with respect to the movement of the conveyor belt, at the point of reversal of the belt or shortly below said point.

2 Claims, 4 Drawing Sheets

DEVICE FOR PURIFICATION OF CONVEYER BELTS

FIELD OF THE INVENTION

The invention relates to a device for cleaning conveyor belts which are provided for heavily soiling bulk goods, such as wet coal, clay or the like.

Such devices in the form of strippers are known.

BACKGROUND OF THE INVENTION

Caking of the conveyor belt occurs nonuniformly over the width of the belt and the length of the belt. The caking adheres nonuniformly firmly to the belt; it is also nonuniform in terms of its layer thickness.

So called end strippers are strippers which are fitted at the belt discharge point, directly under the discharge parabel, at the drive roller; they remove the caking on the conveyor belt more or less intensively. Transversely acting strippers at the discharge point are frequent.

Such transversely acting strippers, known in practice, may be subdivided into those which effect more intensive cleaning and those which effect less intensive cleaning. The so-called slat stripper has primarily become widespread nowadays as a transversely acting stripper. However, this stripper only satisfies the object set to a certain extent. It comprises a steel housing or an axle equipped over its length with a number of flat slats or modules. These are spring-mounted and thus bring about a different contact pressure, but this is uniform only over the respective track width.

The contact pressure of the conveyor belt against the drive drum is very high, caused by the high tractive force of the drum, as a result of which relatively low elevations or depressions in the belt only ever allow the slats to act at the highest point of the unevenness. If an encrustation on the belt cannot be detached by the slats, or if the belt has not been repaired, by means of applied patches, in such a way that the belt surface is completely even, in the surrounding area the adhering soiling on the belt is not stripped off. If, in addition, the belt is further damaged by depressions (grooves or detached, upper belt-ply cover sheets), then the soiling remains adhering there as well.

The same is to be feared when the drive drum has worn nonuniformly and, as a result, the belt surface in the region of the strippers is not even. In order to permit the conveyor belt to move to the left and right, the drive drums are often crowned, that is to say their diameter decreases from the center toward the ends, which means that the drive drum is highest at the center. In the case of such crowned drums, cleaning using standard transversely acting strippers cannot be achieved at all.

SUMMARY OF THE INVENTION

Surprisingly, according to the invention these disadvantages are eliminated by a resilient, fluid-loaded transversely acting stripper which is arranged transversely with respect to the movement of the conveyor belt, at the point of reversal of the belt or shortly below said point.

A transversely acting stripper itself is expediently not of segmented construction.

The transversely acting stripper may advantageously have a shape which follows that of the deflection drum, which may in particular be of crowned design.

The transversely acting stripper expediently comprises a steel enclosure with an incorporated or attached resilient stripper.

It is particularly expedient for the resilient transversely acting stripper to be loaded or to be able to be pressed against the conveyor belt pneumatically.

It is particularly beneficial if the stripper housing is designed to be inherently twisted, especially by 10° over its length.

A resilient pressure chamber may be arranged between housing and stripper.

The stripper element is preferably composed of polyurethane or multi-layer rubber and, if appropriate, abrasive material with ceramic platelets cast in, adhesively bonded in or scattered in.

The pressure chamber that loads the stripper element may be connected by a connecting line to a reservoir provided with a regulator.

BRIEF DESCRIPTION OF THE DRAWINGS

An exemplary embodiment of the invention will now be explained in more detail with reference to the appended drawings, in which.

DESCRIPTION OF THE PREFERRED EMBODIMENTS

Figure 1:
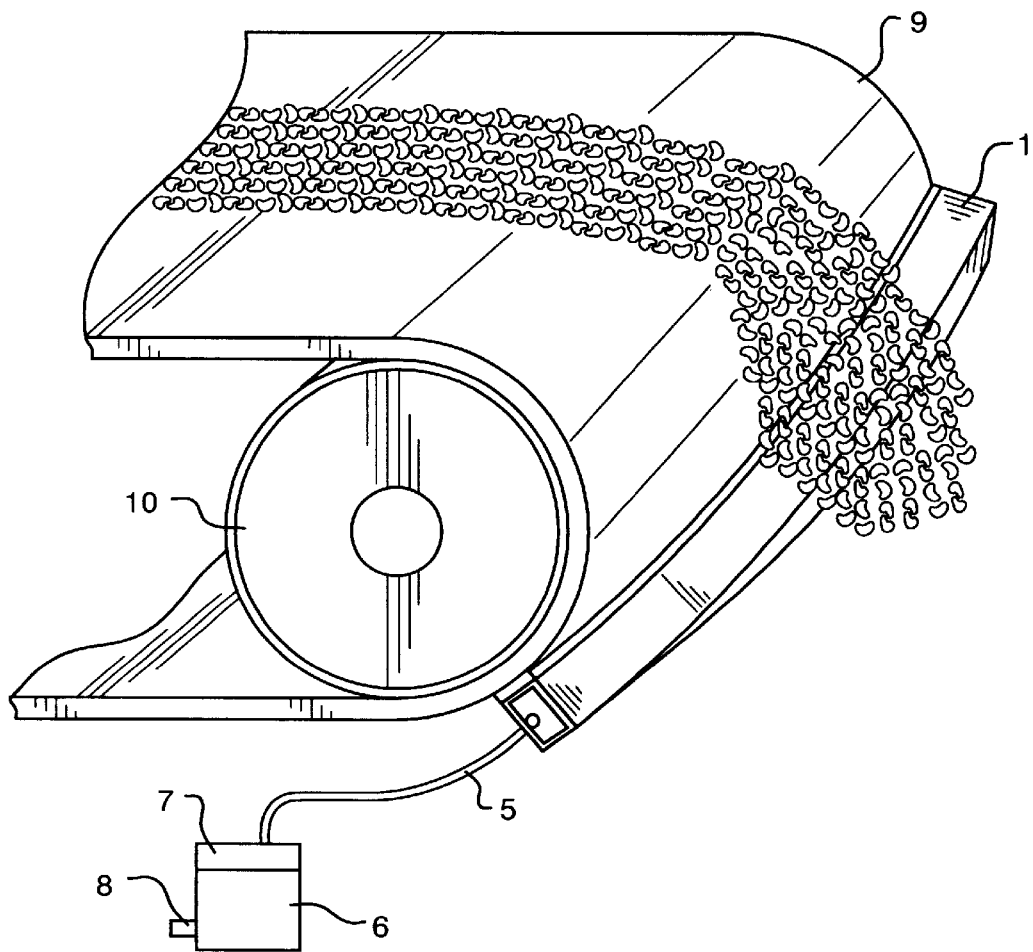
FIG. 1 shows a conveyor belt lying on a drive drum, with a stripper.

According to FIG. 1, a belt 9 runs around a drum 10, which may be of crowned design but does not have to be.

At the end there is a stripper 1. The position is shown as an example. The stripper may be arranged further down after the discharge point and may press pneumatically against the belt.

It is possible to see the twist over the length of the stripper. The twist is selected as required over the length of the stripper element, and according to an exemplary embodiment is, for example, 10°. The result of the twist is that even irregularities in the belt, and faults such as depressions, are compensated for.

The pressure chamber 2 of the stripper 1 is connected via a connecting hose 5 to the pressure reservoir 6. Regulation, for example to a pressure of 1 bar, is carried out via the regulator 7 on the top of the pressure reservoir 6. A filling connection on the pressure reservoir 6 is indicated at 8.

Figure 2:
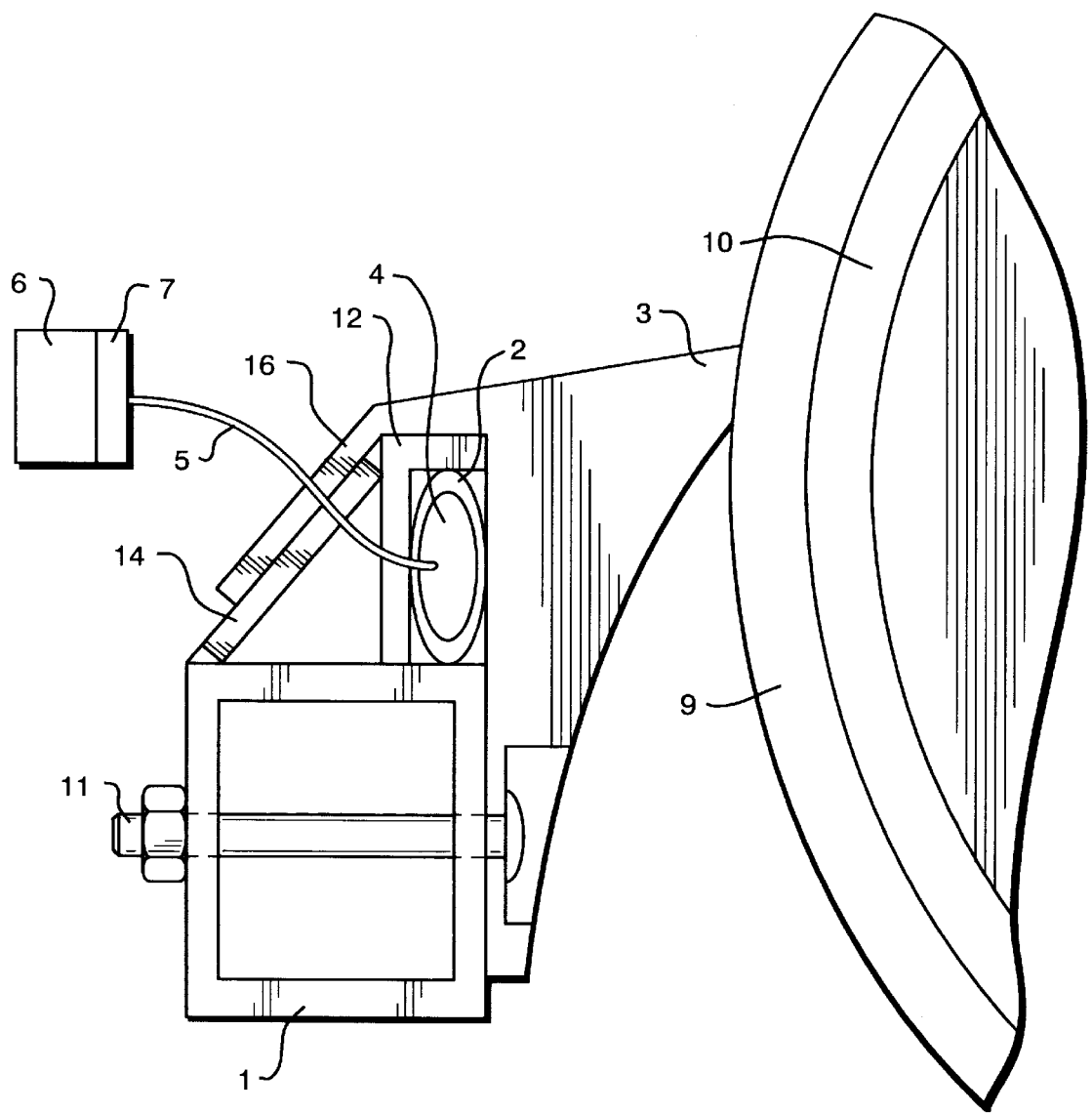
FIG. 2 is a section through a drum with a stripper element.

One possible implementation of the stripper is shown in FIG. 2. Within a stripper housing 1 which is twisted (in mechanical engineering, one also says: the housing as a twist), there is a pressure chamber for a pneumatic or hydraulic medium 4. The pressure chamber 4 loads the resilient stripper element 3. The stripper housing has a steel profile which is open toward the belt and can be closed at the two ends.

One possible implementation is shown in FIG. 2. In the present case, the stripper element 3 no longer bears a housing. The housing has been replaced by a carrier profile 1, which is connected to the stripper element 3 by a countersunk screw 11. In section, the stripper element 3 is of approximately wedge-shape design, the outside of the wedge being fastened to the carrier profile 1 by the countersunk screw 11. The head of the countersunk screw is mounted in a recess in the stripper element, in such a way that the screw cannot come into contact with the drum belt 9. Situated on the carrier profile 1 is an angle profile 12, within which the hose profile 2 is mounted in a pressure chamber. The outside of the angle profile is connected to the carrier profile 1 via a strut 14.

This is only one possible implementation. In general, the parts 1, 14 and 12 will be produced as a single extruded profile, the shape being adapted to the production requirements.

Equipment is provided which supplies a contact pressure, in particular a pneumatic pressure, to the pressure chamber 2 in a self-metering way, said contact pressure always matching any conveyor-belt unevenness given the same pressure level. The reservoir 6, which is supplied by a compressor, for example, always provides a constant pressure to the pressure chamber 2 via the regulator 7. If, for example, the shape of the hose in the pressure chamber 2 enlarges, correspondingly more air is regulated in until the same pressure (for example 0.5 bar) is reached.

Figure 3:
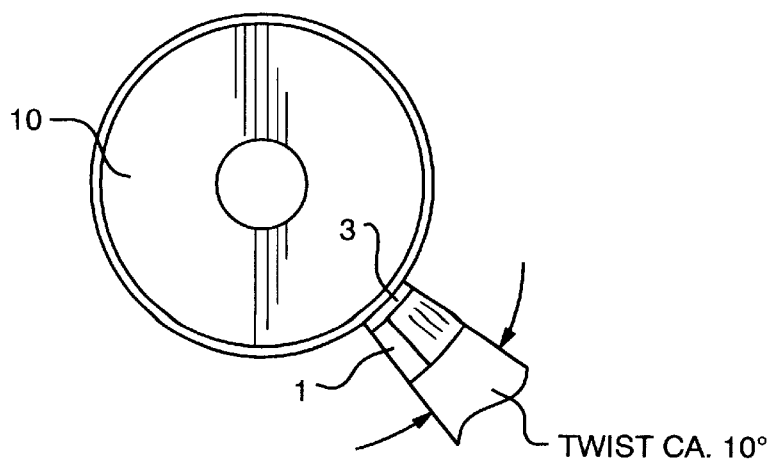
FIG. 3 shows a detail.

FIG. 3 makes it possible to see the detail relating to how the adjustment of the stripper element 3, which is primarily resilient, presses against the belt and hence the drive drum of the conveyor-belt system 10. The twist is indicated as about 10° (with the reference twist). This value can be varied by a few degrees. The twist, which increases the stripper capacity, also prevents damage to the belt, in particular in the case of damaged or patched and not satisfactorily overlapping endless joints. It is further possible to see the connection in the front of the stripper pocket.

The pressure chamber shown as an example can, however, also be replaced by cylinders or similar constructions.

For special cases, it may be important to use an inert medium such as nitrogen, or a mixture of air with an inert medium, instead of air or fluid.

Such a stripper finds application, for example, in mining, in gravel and clay quarries, in the foodstuff or animal-feed industry or in the transport of ceramic compounds, without the application being restricted to these.

According to another embodiment, the housing for the stripper element may also be produced not from steel but from a different metal, but equally well (depending on the purpose) from plastic. It can also optionally be produced from steel covered with plastic.

The twisted holder profile, which was referred to above as a channel profile, can also be designated a rectangular pocket or the like.

According to another embodiment, the twist may optionally also increase as far as the center, and may be designed to fall from the center on the other side.

The amount of twist is adapted to the object set. The amount of twist may be between 5 and 30°.

Figure 4:
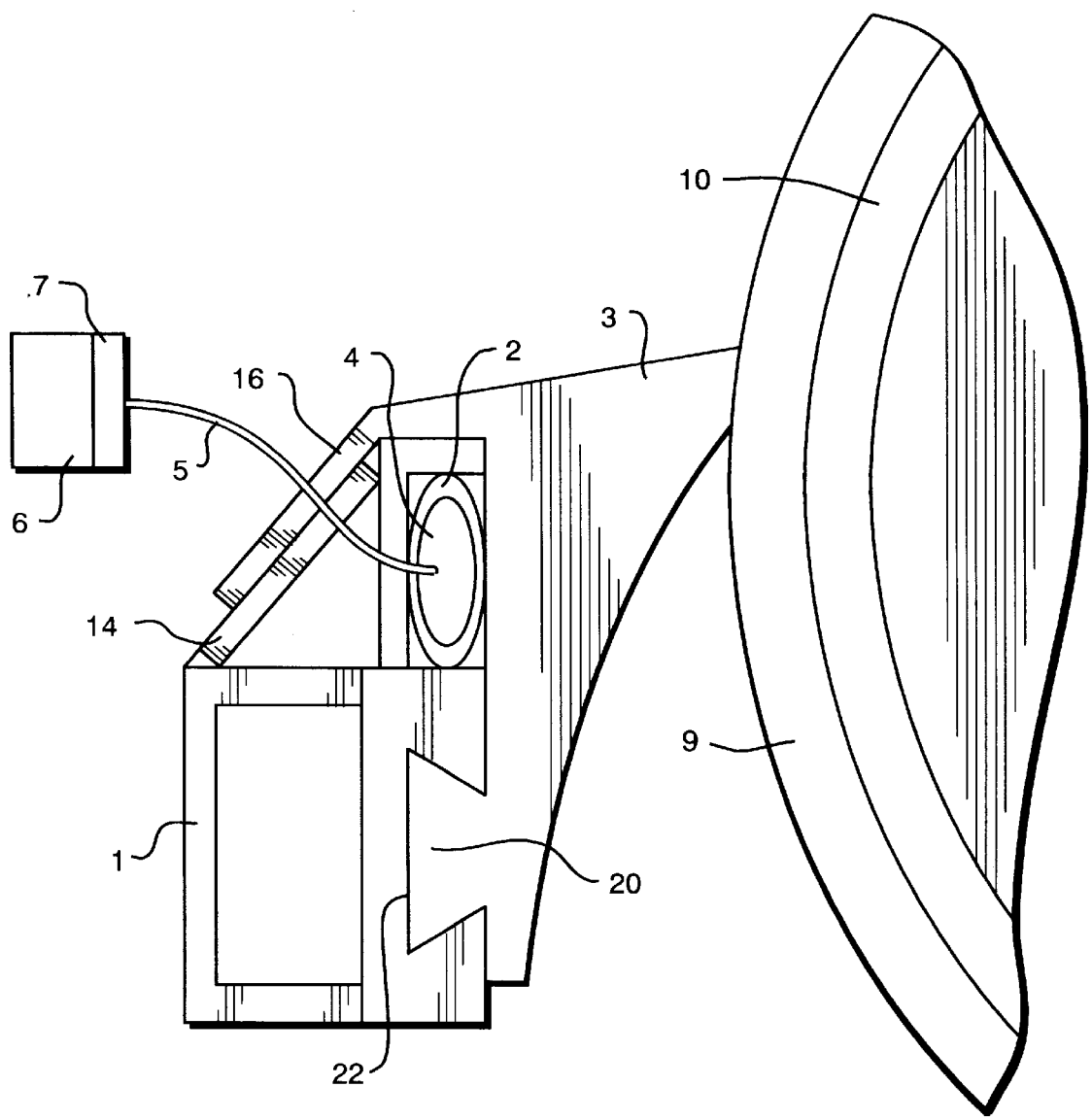
FIG. 4 shows an alternative fastening of the stripper element.

The connection using the countersunk screw is not imperative. According to FIG. 4, it is also possible to permit a dovetail-shaped holder 20 on the rear of the stripping element to latch into a dovetail groove 22 in the carrier profile 1. Of course, any other technically practical connection between the stripping element 3 and carrier profile is possible. The stripping element 3 engages over the aforementioned strut 14 with an apron 16, and thus secures the hold between stripping element 3; 16 and carrier profile (here, angle profile and strut).

For reasons of illustration, the fastening of the stripping element has been placed relatively high. In practice, the entire stripping element and the carrier profile will be fitted further below in relation to the drum.

By means of the self-metering, in particular pneumatic, contact pressure, a pressure which is always at a constant level will match every conveyor-belt unevenness, since the regulator 7 regulates to a constant pressure.

The pressure chamber 2 may be produced from a firefighting hose, for example textile-armored on the outside, the hose being composed of elastomer/rubber.

Figure 5:
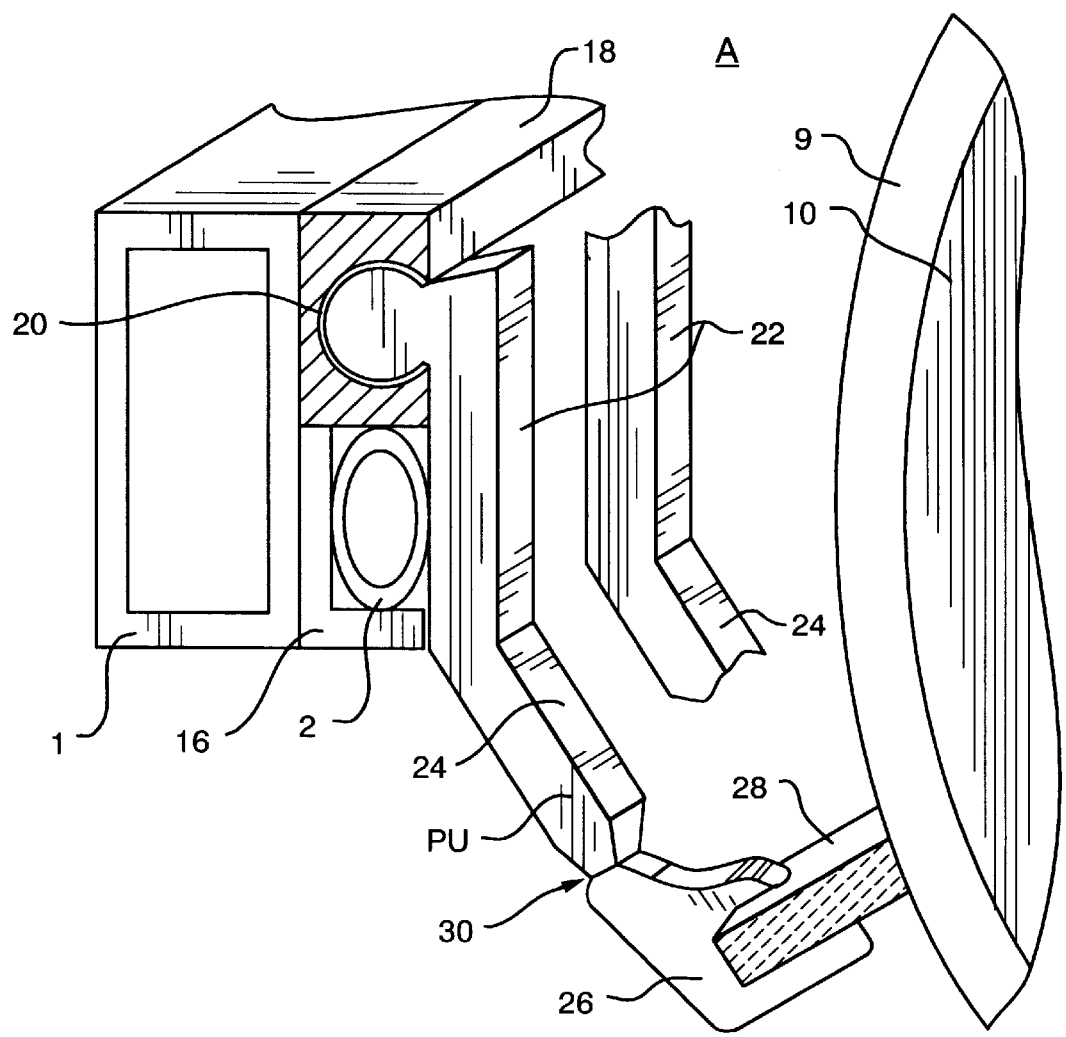
FIG. 5 shows an alternative possible adjustment.
Figure 5:
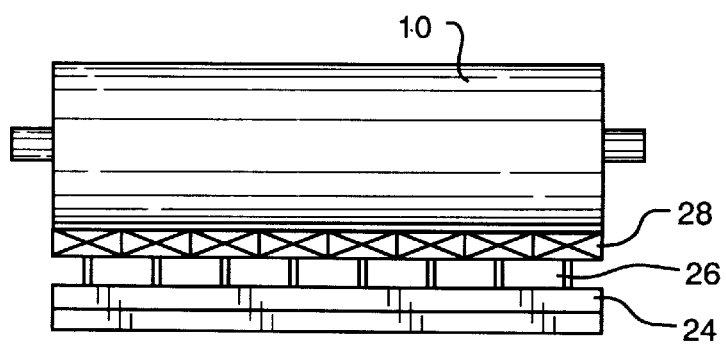

FIG. 5 shows an alternative possible adjustment. In this case, an angled rail 16 is fastened rigidly to the steel carrier 1 of the transversely acting stripper and carries the pressure chamber 2, which is constructed in the form of the aforementioned hose or the like. Furthermore, a positioning bar 18 made either of iron or of PU is fixed at the top to the stripper housing 1 and, in said positioning bar, a type of spherical pan 20 is provided in order to form a spherical hinge with the projecting spherical head of an arm 22. A number of such arms 22 are arranged along the bar of the stripper. The second bar [sic] is only illustrated in broken form. The fastening is similar. Many such arms can be provided along the stripper housing. The arms 22 are bent over toward the drum (at 24). They are composed essentially of PU. There is then a constriction 30, which deliberately places the twist in this cross section. A further bent-over portion results in the limb 26 of the arm, into which ceramic 28 is cast or adhesively bonded. The arms are therefore simultaneously resilient and stiff, this being brought about by the material and the shape (bent-over portions with a deliberate weakening point 30). The drum is again designated by 10, the conveyor belt is again designated by 9. While the section has been designated by A, the front view of the drum at the bottom has been designated by B. The reference symbols have been selected as in the other figures, to the extent that these are identical elements.

In operation, therefore, the pressure chamber 2 is again inflated via the regulator and presses the arms 22, and therefore their bent-over portions and the ceramic 28 provided at the end, against the conveyor belt 9 running over the drum 10. As a result of the resilience of the polyurethane arms, the ceramic pieces are pressed resiliently against the conveyor belt.

It is not denied that transversely acting strippers (e.g. DE 40 38 187) are known in a design in which an air spring cushion loads individual intermediate pieces which press a rigid cleaning strip against a conveyor belt. Different pressures can therefore be applied only from segment to segment (from intermediate piece to intermediate piece). The cleaning strip does not adapt to the belt surface to be cleaned. Pressure regulation is not provided. The actual stripper is already pressed toward the belt during installation by means of appropriate positioning. If the drive drum is crowned, which is certainly intended to avoid the belt running crookedly, then the cleaning power decreases dramatically.

In the design according to the invention, the contact pressure always remains the same and nevertheless achieves good and careful belt cleaning. The cleaning strip is able to adapt continuously to the belt surface to be cleaned at any point over its entire length.

Finally, it is further known (U.S. Pat. No. 5,121,829) to carry out cleaning directly using compressed-air loading.

What is claimed is:

1. A device for cleaning a conveyor belt, said conveyor belt having; a forward position, a reverse position, and a return position, a carrying surface, a right edge and a left edge, and a deflection drum having a selected surface contour, said device comprising:

a resilient, fluid-loaded transversely acting stripper, having a belt proximal surface and a belt distal surface, which is arranged transversely with respect to the movement of said conveyor belt, at substantially said reverse position of said conveyor belt or shortly below said reverse position but towards said return position of said conveyor belt and wherein said transversely acting stripper belt proximal surface takes a shape which corresponds to said selected surface contour of said deflection drum, wherein said deflection drum selected surface contour is of crowned design and further wherein said transversely acting stripper comprises a stripper housing having a rectangular box-like shape with a housing right side and a housing left side, said housing right side being adjacent to said conveyor belt right edge and said housing left side being adjacent to said conveyor belt left edge, wherein said stripper housing surrounds said transversely acting stripper, and wherein said housing right side is twisted by between about 5° and 30° with respect to said housing left side.

2. A method of cleaning conveyor belts comprising;

arranging a continuous resilient stripper transversely with respect to the movement of said conveyor belt at or below the point of reversal of said conveyor belt;

twisting said stripper transversely by about 5° to 30°;

connecting in sequence a pressure chamber, then a regulator, then said stripper;

loading a resilient stripper by introduction of pneumatic pressure from said pressure chamber;

regulating the pressure of said fluid through said regulator;

pressing said resilient stripper transversely against said conveyor belt; and operating said conveyor belt normally such that said stripper applies constant pneumatic pressure against said belt from which debris is removed.

* * * * *